(12) United States Patent
Mirkin et al.

(10) Patent No.: US 7,842,344 B2
(45) Date of Patent: Nov. 30, 2010

(54) PEPTIDE AND PROTEIN ARRAYS AND DIRECT-WRITE LITHOGRAPHIC PRINTING OF PEPTIDES AND PROTEINS

(75) Inventors: Chad A. Mirkin, Wilmette, IL (US); Jung-Hyurk Lim, Kimpo (KR); David S. Ginger, Seattle, WA (US); Jwa-Min Nam, Evanston, IL (US); Ki-Bum Lee, Northbrook, IL (US); Linette Demers, Evanston, IL (US); Albena Ivanisevic, Evanston, IL (US)

(73) Assignee: Northwestern University, Evanston, IL (US)

( * ) Notice: Subject to any disclaimer, the term of this patent is extended or adjusted under 35 U.S.C. 154(b) by 1339 days.

(21) Appl. No.: 10/788,414

(22) Filed: Mar. 1, 2004

(65) Prior Publication Data
US 2005/0009206 A1 Jan. 13, 2005

Related U.S. Application Data

(63) Continuation of application No. 10/442,189, filed on May 21, 2003, now abandoned, and a continuation-in-part of application No. PCT/US03/15821, filed on May 21, 2003.

(60) Provisional application No. 60/445,233, filed on Feb. 6, 2003, provisional application No. 60/418,179, filed on Oct. 15, 2002, provisional application No. 60/382,596, filed on May 21, 2002.

(51) Int. Cl.
*B05D 1/36* (2006.01)

(52) U.S. Cl. .................. 427/258; 427/301; 427/333; 977/857; 977/884; 977/885; 977/886; 436/518

(58) Field of Classification Search .................. None
See application file for complete search history.

(56) References Cited

U.S. PATENT DOCUMENTS

| 5,039,458 A | 8/1991 | Braatz et al. |
| 5,747,334 A | 5/1998 | Kay et al. |
| 5,858,801 A | 1/1999 | Brizzolara |

(Continued)

FOREIGN PATENT DOCUMENTS

EP 0 450 771 A 10/1991

(Continued)

OTHER PUBLICATIONS

Knapp, H. F., et al., "Preparation, Comparison and Performance of Hydrophobic AFM Tips", Surface and Interface Analysis, vol. 27, No. 5/6, pp. 324-331 (1999).

(Continued)

*Primary Examiner*—Nelson Yang
(74) *Attorney, Agent, or Firm*—Foley & Lardner LLP

(57) ABSTRACT

The present invention relates to the use of direct-write lithographic printing of proteins and peptides onto surfaces. In particular, the present invention relates to methods for creating protein and peptide arrays and compositions derived therefrom. Nanoscopic tips can be used to deposit the peptide or protein onto the surface to produce a pattern. The pattern can be dots or lines having dot diameter and line width of less than 1,000 nm. The tips and the substrate surfaces can be adapted for the peptide and protein lithography.

115 Claims, 8 Drawing Sheets

U.S. PATENT DOCUMENTS

| | | | |
|---|---|---|---|
| 6,103,479 | A | 8/2000 | Taylor |
| 6,270,946 | B1 | 8/2001 | Miller |
| 6,573,369 | B2 | 6/2003 | Henderson et al. |
| 6,635,311 | B1 | 10/2003 | Mirkin et al. |
| 6,642,129 | B2 | 11/2003 | Liu et al. |
| 6,674,074 | B2 | 1/2004 | Schwartz et al. |
| 6,827,979 | B2 | 12/2004 | Mirkin et al. |
| 2001/0004526 | A1* | 6/2001 | Everhart et al. .............. 435/6 |
| 2002/0028463 | A1* | 3/2002 | Duffy ........................... 435/6 |
| 2002/0063212 | A1* | 5/2002 | Mirkin et al. ............ 250/306 |
| 2002/0098364 | A1* | 7/2002 | Bernard et al. ............ 428/447 |
| 2002/0102743 | A1* | 8/2002 | Majumdar et al. ......... 436/518 |
| 2002/0122873 | A1 | 9/2002 | Mirkin et al. |
| 2003/0068446 | A1 | 4/2003 | Mirkin et al. |
| 2003/0162004 | A1 | 8/2003 | Mirkin et al. |
| 2003/0185967 | A1 | 10/2003 | Eby et al. |
| 2004/0008330 | A1 | 1/2004 | Mirkin et al. |

FOREIGN PATENT DOCUMENTS

| | | |
|---|---|---|
| EP | 0 511 662 A1 | 11/1992 |
| WO | WO 96/31625 | 10/1996 |
| WO | WO 00/04390 | 1/2000 |
| WO | WO 00/41213 A1 | 7/2000 |
| WO | WO 01/91855 A1 | 12/2001 |
| WO | WO 02/45215 A2 | 6/2002 |
| WO | WO 03/001633 A | 1/2003 |
| WO | WO 03/038033 A | 5/2003 |

OTHER PUBLICATIONS

Voigt, J., et al., "Nanofabrication with scanning nanonozzle 'Nanojet'", Microelectrotronic Engineering, Elsevier, vol. 57-58, pp. 1035-1042 (Sep. 2001).

PCT International Search Report dated Jun. 29, 2004.

Gergely et al., "Unbinding process of adsorbed proteins under external stress studied by atomic force microscopy spectroscopy", PNAS, vol. 97, No. 20, pp. 10802-10807 (2000).

Jung et al., "Surfactant Activated Dip-Pen Nanolithography", Nano Letts., vol. 4, No. 11, pp. 2171-2177 (2004).

Lim et al., "Direct-Write Dip-Pen Nanolithography of Proteins on Modified Silicon Oxide Surfaces", Angew. Chem. Int. Ed., vol. 42, pp. 2309-2312 (2003).

U.S. Appl. No. 10/307,515, filed Dec. 2, 2002, Mirkin et al.

U.S. Appl. No. 10/375,060, filed Feb. 28, 2003, Dupeyrat et al.

Agarwal, G., et al., "Dip-Pen Nanolithography in Tapping Mode", J. Am. Chem. Soc., vol. 125, pp. 580-583 (2003).

Blawas, A. S., et al., "Protein patterning", Biomaterials, vol. 19, pp. 595-609 (1998).

Chen, C. S., et al., "Geometric Control of Cell Life and Death", Science, vol. 276, pp. 1425-1428 (1997).

Demers, L. M., et al., "Direct Patterning of Modified Oligonucleotides on Metals and Insulators by Dip-Pen Nanolithography", Science, vol. 296, pp. 1836-1838 (2002).

Harder, P., et al., "Molecular Conformation in Oligo(ethylene glycol)-Terminated Self-Assembled Monolayers on Gold and Silver Surfaces Determines Their Ability to Resist Protein Adsorption", J. Phys. Chem. B, vol. 102, pp. 426-436 (1998).

Hong, S., et al., Multiple Ink Nanolithography: Toward a Multiple-Pen Nano-:lotter, Science, vol. 286, pp. 523-525 (1999).

Houseman, B. T., et al., "Maleimide-Functionalized Self-Assembled Monolayers for the Preparation of Peptide and Carbohydrate Biochips", Langmuir, vol. 19, pp. 1522-1531 (2003).

Jones, V. W., et al., "Microminiaturized Immunoassays Using Atomic Force Microscopy and Compositionally Patterned Antigen Arrays", Anal. Chem., vol. 70, No. 7, pp. 1233-1241 (1998).

Kenseth, J. R., et al., "Investigation of Approaches for the Fabrication of Protein Patterns by Scanning Probe Lithography", Langmuir, vol. 17, pp. 4105-4112 (2002).

Lee, K.-B, et al., "Protein Nanostructures Formed via Direct-Write Dip-Pen Nanolithography", J. Am. Chem. Soc., No. 125, pp. 5588-5589 (2003).

Lee, K.-B., et al., "Protein Nanoarrays Generated by Dip-Pen Nanolithography", Science, vol. 295, pp. 1702-1705 (2002).

Lockhart, D. J., et al., "Genomics, gene expression and DNA arrays", Nature, vol. 405, pp. 827-836 (2000).

MacBeath, G., "Printing Proteins as Microarrays for High-Throughput Function Determination", Science, vol. 289, pp. 1760-1763 (2000).

Madou, M. J., Fundamentals of Microfabrication, The Science of Miniaturization, $2^{nd}$ Ed., CRC Press, pp. 68-69 (Protein patterning), 2002.

Madou, M. J., Fundamentals of Microfabrication, The Science of Miniaturization, $2^{nd}$ Ed., CRC Press, pp. 159-169 (deposition & arraying methods of organic layers in BIOMEMS), 2002.

Madou, M. J., Fundamentals of Microfabrication, The Science of Miniaturization, $2^{nd}$ Ed., CRC Press, pp. 435-439 (primary, secondary, tertiary, and quaternary structures and synthesis by ribosomes), 2002.

Madou, M. J., Fundamentals of Microfabrication, The Science of Miniaturization, $2^{nd}$ Ed., CRC Press, pp. 447-452 (antibodies, antigens, and enzymes), 2002.

McKendry, R., et al., "Creating Nanoscale Patterns of Dendrimers on Silicon Surfaces with Dip-Pen Nanolithography", NanoLetters, vol. 2, pp. 713-716 (2002).

Noy, A., et al., "Fabrication of Luminescent Nanostructures and Polymer Nanowires Using Dip-Pen Nanolithography", NanoLetters, No. 2, No. 2, pp. 109-112 (2002).

O'Brien, J. C., et ., "Immunosensing Platforms Using Spontaneously Adsorbed Antibody Fragments on Gold", Anal. Chem., vol. 72, pp. 703-710 (2000).

Papra, A., et al., "Characterization of Ultrathin Poly(ethylene glycol) Monolayers on Silicon Substrates", Langmuir, vol. 17, pp. 1457-1460 (2001).

Piner, et al., "Dip-Pen Nanolithography", Science, vol. 283, pp. 661-663 (1999).

Schena, M., et al., "Quantitative Monitoring of Gene Expression Patterns with a Complementary DNA Microarray", Science, vol. 270, pp. 467-470 (1995).

Schwartz, P. V., "Molecular Transport from an Atomic Force Microscope Tip: A Comparative Study of Dip-Pen Nanolithography", Langmuir, vol. 18, pp. 4041-4046 (2002).

Service, R., "Biology Offers Nanotechs A Helping Hand", Science, vol. 298, pp. 2322-2323 (2002).

Wadu-Mesthrige, K., et al., "Fabrication of Nanometer-Sized Protein Patterns Using Atomic Force Microscopy and Selective Immobilization", Biophys. J., vol. 80, pp. 1891-1899 (2001).

Wadu-Mesthrige, K., et al., "Immobilization of Proteins on Self-Assembled Monolayers", SCANNING, vol. 22, pp. 380-388 (2000).

Weinberger, D. A., et al., "Combinatorial Generation and Analysis of Nanometer- and Micrometer-Scale Silicon Features via 'Dip-Pen' Nanolithography and Wet Chemical Etching", Adv. Mater., vol. 12, No. 21, pp. 1600-1603 (2000).

Wilson, D. L., et al., "Surface organization and nanopatterning of collagen by dip-pen nanolithography", PNAS, vol. 98, No. 24, pp. 13660-13664 (2001).

Zhang, M., et al., "A MEMS nanoplotter with high-density parallel dip-pen nanolithography probe arrays", Nanotechnology, vol. 13, pp. 212-217 (2002).

* cited by examiner

PEPTIDE AND PROTEIN ARRAYS AND DIRECT-WRITE LITHOGRAPHIC PRINTING OF PEPTIDES AND PROTEINS

CROSS-REFERENCE TO RELATED APPLICATIONS

This application claims the benefit of U.S. regular application, Ser. No. 10/442,189 filed May 21, 2003 to Mirkin et al., and co-pending PCT application which designates the U.S., serial no. PCT/US03/15821 filed May 21, 2003 to Mirkin et al. "Peptide And Protein Arrays And Direct-Write Lithographic Printing Of Peptides And Proteins,", each of which claims the benefit of provisional patent applications Ser. Nos. 60/382,596 filed May 21, 2002 to Mirkin et al., "Electrostatically Driven Dip-Pen Nanolithography of Conducting Polymers"; provisional patent application Ser. No. 60/418,179 filed Oct. 15, 2002 to Mirkin et al. "Peptide and Protein Nanoarrys and Direct-Write Nanolithographic Printing of Peptides and Proteins"; and provisional patent application Ser. No. 60/445,233 filed Feb. 6, 2003 to Mirkin et al. "Peptide and Protein Nanoarrys and Direct-Write Nanolithographic Printing of Peptides and Proteins".

STATEMENT OF FEDERAL FUNDING

The inventions herein were developed under grants from the following federal government funding sources: Air Force Office of Scientific Research, Grant No. F49620-00-1-0283/P01; Defense Advanced Research Projects Agency (DARPA), Grant No. DAAD 19-00-1-0414; and the National Science Foundation, Grant No. EEC-0118025. The government retains certain rights in the invention.

BACKGROUND

Direct-write lithographic patterning or printing of biological structures is important for many reasons. For example, direct-write lithographic patterning provides fabrication of microscopic and nanoscopic patterns with extraordinary complexity and offers routes to important devices in the life sciences such as gene chips, proteomic arrays, and other diagnostic tools. Important biological nanostructures in life science applications include oligonucleotides, DNA, peptides, proteins, and viruses. In particular, microarrays of biomolecules such as DNA and proteins have proven useful as high throughput screening tools in proteomics, genomics, and the identification of new pharmaceutical compounds. For example, DNA microarrays can be used to probe gene expression and in panel assays for research- and clinical-based diagnostics. Arrays of proteins have been used to ask and answer important questions regarding the interactions of cells with underlying substrates. As the complexity of these arrays and corresponding number of features increase, the ability to reduce feature size becomes more important, especially since the area occupied by an array will affect the amount and volume of a sample that can he used with a particular chip. Therefore, arrays with smaller and more densely packed features are becoming increasingly attractive. In addition, if one can fabricate such structures with features that have nano- rather than macroscopic dimensions, one can enable new screening technologies and begin to address important fundamental questions regarding biomolecular recognition that are not addressable with microarrays. Indeed, bio-recognition is generally a nanoscopic rather than microscopic phenomenon.

In particular, direct-write nanolithographic patterning and printing of peptide- and protein-based nanostructures is important in a variety of areas including, for example, proteomics, diagnostics, and materials science. Such methods would allow one to fabricate patterns of peptide and protein nanostructures with extraordinary complexity, offering routes to important tools in the life sciences such as protein libraries, protein chips, and proteomic arrays, and templates that can be used by chemists and material scientists to build ordered two and three-dimensional functional architectures.

Direct-write nanolithographic patterning or printing offers advantages over competing approaches such as indirect patterning methods. In a typical indirect method, an intermediate compound is first patterned which serves as a template for the biological nanostructure design. Unlike photolithographic methods, the direct-write method has no need for a resist and easier processing and fabrication procedures. As a result, known direct-write nanolithographic printing methods have become powerful tools in nanotechnology. Some of these methods use one or more nanoscopic tips, such as scanning probe microscope (SPM) tips including atomic force microscope (AFM) tips. In some embodiments, the tips are used to deliver one or more patterning compounds onto a substrate surface from the tips. The result is the ability to generate detailed, stable patterns at high resolution and nanoscale dimensions over a wide variety of shapes in serial or parallel modes. Potential applications range beyond biotechnology and pharmaceutical industries, extending to semiconductor and computer technologies as well.

Despite its importance, direct-write patterning or printing methods can pose challenges not encountered in the indirect methods. For example, challenges can arise in transporting high-molecular-weight biomolecules from a coated tip to a substrate and the need for bio-compatible patterning conditions. High resolution and patterning speed are important which should not be sacrificed in patterning biomolecules.

Although some promising advances have been made in making protein patterns with features with nanoscopic dimensions, challenges remain, particularly with patterns below about 200 nm in lateral dimension. For example, protein nanopatterns generally have been made by indirect methods that either involve resists or prefabricated chemical affinity templates. These templates direct the assembly of a single protein structure from solution onto a set of nanoscopic features on a surface of interest. Often, the bio-recognition properties and control over feature size on the sub-200 nm scale are not demonstrated. In addition, to be able to generate nanoarrays of multicomponent systems, a requisite for many of the anticipated applications of nanoarrays, it is important that new surface analytical tools as well as the complementary chemistry be developed for directly placing a set of different protein structures on a surface of interest with nanoscale resolution, high registration alignment capabilities, and control over the biological activity of the resulting structures.

In addressing these challenges, one promising direct-write patterning approach is being developed by the Mirkin group at Northwestern University and NanoInk, Inc. under the name DIP-PEN NANOLITHOGRAPHY™ (DPN)™ patterning and printing (proprietary trademarks of NanoInk, Inc., Chicago, Ill.). In a typical DPN™ printing application, a patterning compound is transported from a nanoscopic tip, preferably an AFM tip, to a substrate to form a desired, stable, useful nanostructure. Basic and novel features of the DPN™ process include the absence of resists, masks, and destructive patterning. Improved patterning methods are needed, however, to maximize commercial applications.

SUMMARY

The present invention encompasses multiple embodiments providing improved protein nanolithographic peptide and protein patterning. The invention summary section is not a limitation on the scope of the invention for any of these embodiments.

The present invention provides, in one embodiment, a method of direct-write lithography for improving the deposition of selected protein patterning compounds comprising: providing a substrate surface; providing a tip with a selected protein patterning compound thereon; depositing the selected protein patterning compound from the tip to the substrate surface to produce a pattern, wherein the tip is modified by a selected chemical agent to improve deposition of the selected protein patterning compound to the substrate surface.

The invention provides, in another embodiment, a method of direct-write nanolithography for improving the deposition of selected peptide patterning compounds comprising: providing a substrate surface; providing a nanoscopic tip with a selected peptide patterning compound thereon; depositing the selected peptide patterning compound from the tip to the substrate surface to produce a pattern, wherein the tip is modified by a selected chemical agent to improve deposition of the selected peptide patterning compound to the substrate surface.

In another embodiment, the present invention provides a method of direct-write nanolithography comprising: providing an atomic force microscopic tip modified to resist protein adsorption and which is coated with protein, providing a substrate comprising an electrostatically charged surface, depositing the protein on the surface to form a protein pattern.

A method of nanolithography comprising: providing a substrate; providing a scanning probe microscope tip coated with a peptide or protein patterning compound, wherein the tip comprises a metallic surface which has been treated to promote protein or peptide coating of the tip; and contacting the coated tip with the substrate so that the peptide or protein patterning compound is applied to the substrate so as to produce a pattern.

The present invention also provides a method of direct-write nanolithography for improving the deposition of selected protein patterning compounds consisting essentially of: providing a substrate surface; providing a nanoscopic tip with a selected natural protein patterning compound thereon; depositing the selected protein patterning compound from the tip to the substrate surface to produce a pattern, wherein the tip is modified by a selected chemical agent to improve deposition of the selected protein patterning compound to the substrate surface.

Also provided is a method of direct-write nanolithography for improving the deposition of selected natural peptide patterning compounds consisting essentially of: providing a substrate surface; providing a nanoscopic tip with a selected peptide patterning compound thereon; depositing the selected peptide patterning compound from the tip to the substrate surface to produce a pattern, wherein the tip is modified by a selected chemical agent to improve deposition of the selected peptide patterning compound to the substrate surface.

The present invention also provides a method for high resolution direct-write nanolithography of peptides and proteins, comprising: direct-write nanolithographic printing of the peptide or protein onto a substrate from a nanoscopic tip to provide a protein or peptide patterned array on the substrate, wherein the nanoscopic tip has been adapted for peptide or protein deposition and the array is characterized by a pattern separation distance of less than about 1,000 nm.

The present invention also provides a method of depositing a plurality of different protein nanoscopic deposits, comprising direct write nanolithographic writing of the protein with nanoscopic tips, wherein the average distance between the nanoscopic deposits is about 500 nm or less.

The present invention also provides a method for generating protein arrays comprising depositing dots of proteins onto a substrate at a rate of at least about 85 dots per four minutes.

The present invention also provides a protein array comprising a plurality of protein dots, wherein the dots have a dot diameter of about 450 nm or less and a dot spacing of about 350 nm or less.

The present invention also provides for lithographically patterned substrates, including arrays, prepared by these and other methods.

DETAILED DESCRIPTION

Figure 1:
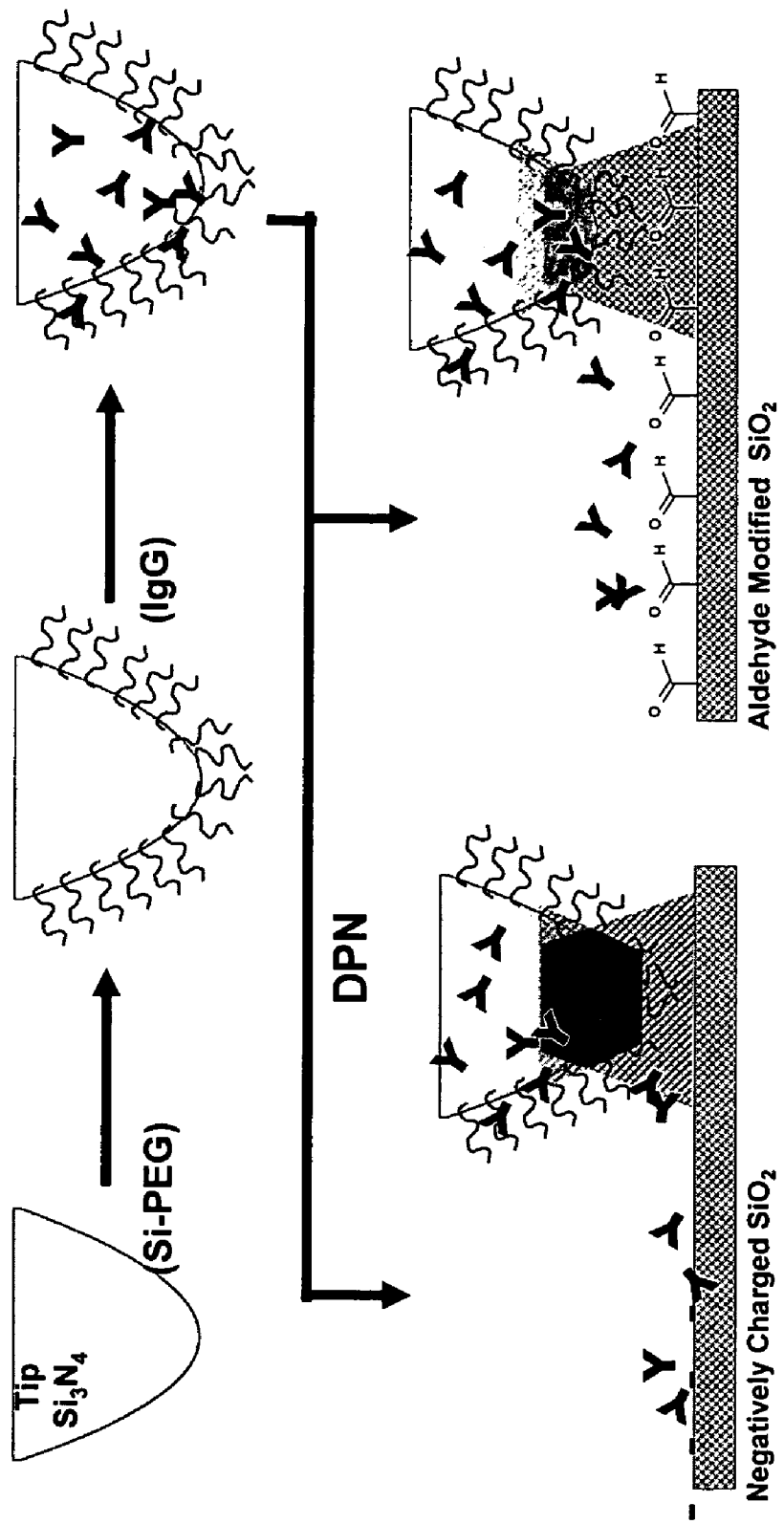
FIG. 1 illustrates the transport of a protein (IgG) from a tip (silicon nitride tip) which is surface modified with a modification agent (Si-PEG) to a substrate which can be a negatively charged substrate (left) or an aldehyde modified substrate (right).

The following priority documents are hereby incorporated by reference in their entirety: provisional patent applications Ser. No. 60/382,596 filed May 21, 2002 to Mirkin et al., "Electrostatically Driven Dip-Pen Nanolithography of Conducting Polymers"; provisional patent application Ser. No. 60/418,179 filed Oct. 15, 2002 to Mirkin et al. "Peptide and Protein Nanoarrys and Direct-Write Nanolithographic Printing of Peptides and Proteins"; and provisional patent application Ser. No. 60/445,233 filed Feb. 6, 2003 to Mirkin et al. "Peptide and Protein Nanoarrys and Direct-Write Nanolithographic Printing of Peptides and Proteins".

In addition, features related to the invention have been described in the publication "Protein Nanostructures Formed via Direct-Write Dip Pen Nanolithography" by Lee et al., *J. Am. Chem. Soc.*, 2003, 125, no. 19, 5588-5589, which is hereby incorporated by reference in its entirety including supporting information available via the internet free of charge.

In addition, patent documents 1-18 at the conclusion of the specification describe direct-write nanolithographic printing methods which can be used by one skilled in the art to practice the present invention and are hereby incorporated by reference in their entirety. In particular, the working examples of these documents are incorporated by reference to show how direct-write nanolithographic printing methods can be used to pattern substrates. Experimental parameters such as humidity, tip treatments, use of apertures in the tips, and substrates are disclosed. In particular, for example, in prior application Ser. No. 09/866,533, filed May 24, 2001, direct-write nanolithographic printing background and procedures are described in detail covering a wide variety of embodiments including, for example:

- background (pages 1-3);
- summary (pages 3-4);
- brief description of drawings (pages 4-10);
- use of scanning probe microscope tips (pages 10-12);
- substrates (pages 12-13);
- patterning compounds (pages 13-17);
- practicing methods including, for example, coating tips (pages 18-20);
- instrumentation including nanoplotters (pages 20-24);
- use of multiple layers and related printing and lithographic methods (pages 24-26);
- resolution (pages 26-27);
- arrays and combinatorial arrays (pages 27-30);
- software and calibration (pages 30-35; 68-70);
- kits and other articles including tips coated with hydrophobic compounds (pages 35-37);
- working examples (pages 38-67);
- corresponding claims and abstract (pages 71-82); and
- FIGS. 1-28.

All of the above text, including each of the various subsections enumerated above including the figures, is hereby incorporated by reference in its entirety and form part of the present disclosure, supporting the claims.

Other publications can also be a guide to the practice of the invention including: (a) Wilson et al., *PNAS*, Nov. 20, 2001, Vol. 98, no. 24, 13660; (b) Noy et al., *NanoLetters*, 2002, Vol. 2, No. 2, 109, (c) Hyun et al., *NanoLetters*, 2002, Vol. 2, No. 11, 1203, (d) U.S. Pat. No. 6,270,946 to Miller (Luna), (e) U.S. Patent Publication 2001-0044106 to Henderson et al. (Nov. 22, 2001) and 2001-0051337 to Henderson et al. (Dec. 13, 2001), and the priority provisional application, 60/1356,290.

In addition, another source is *Fundamentals of Microfabrication, The Science of Miniaturization*, $2^{nd}$ Ed., Marc J. Madou, CRC Press. For example, deposition and arraying methods of organic layers in BIOMEMS is discussed on pages 159-169, including protein patterning with lithography. Protein patterning is also described on pages 68-69, and proteins are generally discussed at pages 435-439, including primary, secondary, tertiary, and quaternary structures and synthesis by ribosomes. Immunosensors are discussed on pages 447-452, including antibodies, antigens, and enzymes.

Additional technical publications relating to SPM probes and deposition of patterning compounds by direct write nanolithography and which are hereby incorporated by reference include: (1) "Meniscus Force Nanografting: Nanoscopic Patterning of DNA," Schwartz, *Langmuir*, 2001, 17, 5971-5977; (2) "Molecular Transport from an Atomic Force Microscope Tip: A Comparative Study of Dip-Pen Nanolithography," Schwartz, *Langmuir*, 2002, 18, 4041-4046; and (3) WO 02/45215 A2 with international PCT publication date of Jun. 6, 2002 to Mirkin, Schwartz, et al. "Nanolithography Methods and Products Therefor and Produced Thereby." The latter PCT publication, for example, discloses use of patterning solutions comprising nucleic acid and salt, including cationic surfactants and ammonium compounds such as, for example, tridodecylmethylamine. The solutions can be aqueous and can be used to coat the SPM tip.

Direct-write lithographic printing, and the aforementioned procedures, instrumentation, and working examples, surprisingly can be further adapted also to generate novel protein and peptide nanoarrays as described further herein (see also references 18a-b below). An approach which can be generally used is illustrated in FIG. 1, which illustrates (1) a nanoscopic tip, (2) adapting the tip with a chemical agent to improve the direct-writing of peptides and proteins, (3) coating the tip with a peptide or protein, and (4) depositing the peptide or protein to different nanoarray substrate surfaces including, for example, modified silicon oxide surfaces adapted for protein and peptide deposition.

Using this general approach, direct-write lithographic printing is particularly useful for the preparation of nanoarrays and biochips, arrays having nanoscopic samples, patterns, and/or features such as dots or lines on the submicrometer scale. Dimensions of about 100 nm or less are of particular interest. Preferably, a plurality of patterns such as, for example, dots or lines are formed on a substrate. The plurality of dots can be a lattice of dots including hexagonal or square lattices as known in the art. The plurality of lines can form a grid, including perpendicular and parallel arrangements of the lines.

The dimensions of the individual patterns including dot diameters and the line widths can be, for example, about 1,000 nm or less, about 500 nm or less, about 300 nm or less, and more particularly about 100 nm or less. The range in dimension for dot diameter or line width can be, for example, about 1 nm to about 750 nm, about 10 nm to about 500 nm, and more particularly about 100 nm to about 350 nm. Particularly good results can be achieved within the range of about 50 nm to about 550 nm. Surprisingly, dots and lines can be formed which are one peptide molecule wide and high. The pattern can be, for example, a monolayer. The height of the pattern can be, for example, about 8 nm to about 10 nm.

High resolution lithography and arrays are generally preferred. The number of patterns in the plurality of patterns is not particularly limited. It can be, for example, at least 10, at least 100, at least 1,000, at least 10,000, at least 100,000, or at least 1,000,000. Square arrangements are possible such as, for example, a 10×10 array. High density arrays are generally preferred. Density can be, for example, at least about 100 features per square micron, or at least about 400 features per square micron, or at least about 1,000 features per square micron. In one embodiment, there are about 420 features per square micron.

High speed patterning is also preferred. Rates can be measured for a single tip. For example, the methods described herein can comprise depositing dots of proteins onto a substrate at a rate of at least about 85 dots per four minutes. Better yet, rates of 50 dots per minute, and better than one dot per second can be achieved. Using a plurality of tips, these rates can be increased by a factor of the number of tips. For example, a array of 32 tips results in an increase of 32× the patterning speed.

High resolution, high density patterning is preferred. The distance between the individual patterns on the nanoarray can vary and is not particularly limited. Distance can be characterized by a pattern separation distance or dot or line spacings, which are measured between the centers of individual patterns (e.g., the center of an individual dot or the center of an individual line). For example, nanoscopic patterns can be separated by distances of less than one micron or more than one micron. The distance can be, for example, about 300 to about 1,500 nm, or about 500 nm to about 1,000 nm. It can be less than about 1,000 nm, less than about 500 nm, or less than about 350 nm. The distance can be averaged, and the average distance between nanoscopic deposits can be about 500 nm or less, about 350 nm or less, about 200 nm or less, and about 100 nm or less.

Distance between separated patterns also can be measured from the edge of the pattern such as the edge of a dot or the edge of a line. This separation distance can be, for example, less than about 1,000 nm, less than about 500 nm, less than about 350 nm, less than about 200 nm, and less than about 100 nm.

Protein binding to substrates is further described in references A3b and A4a below, which are hereby incorporated by reference in its entirety.

In the peptide and protein nanoarrays of this invention, the nanoarrays can be prepared comprising various kinds of chemical structures comprising peptide bonds. These include peptides, proteins, oligopeptides, and polypeptides, be they simple or complex. The peptide unit can be in combination with non-peptide units. The protein or peptide can contain a single polypeptide chain or multiple polypeptide chains. Linear and cyclic peptide structures can be present. Higher molecular weight peptides are preferred in general although lower molecular weight peptides including oligopeptides can be used. The number of peptide bonds in the peptide can be, for example, at least three, ten or less, at least 100, about 100 to about 300, or at least 500.

The peptides and proteins can comprise the 20 amino acids commonly found in biological systems including alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

Proteins are particularly preferred as peptide. The protein can be simple or conjugated. Examples of conjugated proteins include, but are not limited to, nucleoproteins, lipoproteins, phosphoproteins, metalloproteins and glycoproteins.

Proteins can be functional when they coexist in a complex with other proteins, polypeptides or peptides. The protein can be a virus, which can be complexes of proteins and nucleic acids, be they of the DNA or RNA types. The protein can be a shell to larger structures such as spheres and rod structures.

Proteins can be globular or fibrous in conformation. The latter are generally tough materials that are typically insoluble in water. They can comprise a polypeptide chain or chains arranged in parallel as in, for example, a fiber. Examples include collagen and elastin. Globular proteins are polypeptides that are tightly folded into spherical or globular shapes and are mostly soluble in aqueous systems. Many enzymes, for instance, are globular proteins, as are antibodies, some hormones and transport proteins, like serum albumin and hemoglobin.

Proteins can be used which have both fibrous and globular properties, like myosin and fibrinogen, which are tough, rod-like structures but are soluble. The proteins can possess more than one polypeptide chain, and can be oligomeric proteins, their individual components being called protomers. The oligomeric proteins usually contain an even number of polypeptide chains, not normally covalently linked to one another. Hemoglobin is an example of an oligomeric protein.

Types of proteins that can be incorporated into a nanoarray of the present invention include, but are not limited to, enzymes, storage proteins, transport proteins, contractile proteins, protective proteins, toxins, hormones and structural proteins.

Examples of enzymes include, but are not limited to ribonucleases, cytochrome c, lysozymes, proteases, kinases, polymerases, exonucleases and endonucleases. Enzymes and their binding mechanisms are disclosed, for example, in *Enzyme Structure and Mechanism* $2^{nd}$ *Ed.*, by Alan Fersht, 1977 including in Chapter 15 the following enzyme types: dehydrogenases, proteases, ribonucleases, staphyloccal nucleases, lysozymes, carbonic anhydrases, and triosephosphate isomerase.

Examples of storage proteins include, but are not limited to ovalbumin, casein, ferritin, gliadin, and zein.

Examples of transport proteins include, but are not limited to hemoglobin, hemocyanin, myoglobin, serum albumin, β1-lipoprotein, iron-binding globulin, ceruloplasmin.

Examples of contractile proteins include, but are not limited to myosin, actin, dynein.

Examples of protective proteins include, but are not limited to antibodies, complement proteins, fibrinogen and thrombin.

Examples of toxins include, but are not limited to, *Clostridium botulinum* toxin, diptheria toxin, snake venoms and ricin.

Examples of hormones include, but are not limited to, insulin, adrenocorticotrophic hormone and insulin-like growth hormone, and growth hormone.

Examples of structural proteins include, but are not limited to, viral-coat proteins, glycoproteins, membrane-structure proteins, α-keratin, sclerotin, fibroin, collagen, elastin and mucoproteins.

Natural or synthetic peptides and proteins can be used. Proteins can be used, for example, which are prepared by recombinant methods. Proteins can be used which are not modified for bonding to the substrate. Reference A6 describes how proteins can be modified for bonding to surfaces.

Peptides and proteins related to the immune system can be used including antibodies.

Histidine-metal binding systems can be used.

Examples of preferred proteins include immunoglobulins, IgG (rabbit, human, mouse, and the like), Protein A/G, fibrinogen, fibronectin, lysozymes, streptavidin, avdin, ferritin, lectin (Con. A), and BSA. Rabbit IgG and rabbit anti-IgG, bound in sandwhich configuration to IgG are useful examples. S-layer type proteins can be used.

Spliceosomes and ribozomes and the like can be used.

A wide variety of proteins are known to those of skill in the art and can be used. See, for instance, Chapter 3, *"Proteins and their Biological Functions. A Survey,"* at pages 55-66 of BIOCHEMISTRY by A. L. Lehninger, 1970, which is incorporated herein by reference. Proteins are described in protein arrays including WO 00/04390 to Zyomyx, Inc. (Jan. 27, 2000). Polypeptides are described in polypeptide expression libraries including WO 96/31625 to Cytogen (Oct. 10, 1996). Random peptide libraries are described in, for example, U.S. Pat. No. 5,747,334. The book noted above, *Fundamentals of Microfabrication, The Science of Miniaturization, $2^{nd}$ Ed.*, Marc J. Madou, CRC Press, also describes proteins of interest in the fields of micro- and nanoarrays.

The methods described in the incorporated by reference document Ser. No. 09/866,533), known in the art, can be used and need not be repeated in their entirety here. These include use of substrate surfaces and nanoscopic tips.

For example, known substrates can be used to make nanoarrays. Smoother substrates are generally preferred which provide for high resolution printing. Substrates can be cleaned and used soon after cleaning to prevent contamination.

For example, a substrate having a surface can be, for example, an insulator such as, for example, glass or a conductor such as, for example, metal, including gold. In addition, the substrate can be a metal, a semiconductor, a magnetic material, a polymer material, a polymer-coated substrate, or a superconductor material. The substrate can be previously treated with one or more adsorbates. Still further, examples of suitable substrates include but are not limited to, metals, ceramics, metal oxides, semiconductor materials, magnetic materials, polymers or polymer coated substrates, superconductor materials, polystyrene, and glass. Metals include, but are not limited to gold, silver, aluminum, copper, platinum and palladium. Other substrates onto which compounds may be patterned include, but are not limited to silica, silicon oxide, GaAs, and InP.

The nanoscopic tip can be, for example, a scanning probe microscopic (SPM) tip. It can be, for example, an atomic force microscope tip (AFM). The tip can be hollow.

Deposition can be carried out under environmentally controlled conditions which control particles in the air, humidity, temperature, vibrational stability, and the like. Humidity control, for example, is described in reference A5 below. One skilled in the art can vary the humidity and temperature to determine the effect on the resolution and quality of the lithography.

Nanoplotters can be used as described in, for example, reference 14a and 14b below, which are hereby incorporated by reference.

The substrate surface can be adapted or modified to provide stable protein and peptide patterns. In general, stability can be found while retaining the biological function of the peptide or protein. For example, covalent bonding and chemisorption between the peptide or the protein and the substrate surface can be used to anchor the peptide or protein. In a typical embodiment, for example, the substrate surface is treated with a compound which exposes at least one functional group on the surface for bonding to the peptide or protein. Known protein coupling compounds can be used including for example compounds which expose electrophilic groups such as aldehyde, isothiocyanate, and the like. In some cases, peptide and protein coupling can occur through the amino groups of the peptide or protein. Also, the substrate surface can also be treated to impart a charge, such as a negative charge, which provides for electrostatic bonding with the protein.

Aldehyde coupling of proteins is described in, for example, reference A1 below (use of aldehyde-containing silane reagent). Reference A4b below also describes protein coupling.

Commercially known methods can be used to couple the peptide or protein to the surface. For example, the company Pierce-Endogen makes available a wide variety of mono- and bifunctional coupling or cross-linking agents for peptides and proteins, and describes protocols for using their products to attach peptides and proteins to various things including, for example, other proteins, small molecules, and appropriately modified surfaces. Examples include: amines to amines (Di-isothiocyanides, eg. DITC); thiols amines (SMBP N-succinimidyl[4-p-maleimidophenyl]butyrate]); carboxyls to amines (EDC, and various carbodiimides); aldehydes/ketones to amines (direct: no coupling agent needed); and the like.

Additional information on peptide and protein attachment can be found in, for example, the text "Bioconjugation: Protein Coupling Technologies for Biomedical Sciences" by M. Aslan and A. H. Dent, which is hereby incorporated by reference including provisions on peptide and protein attachment methods.

Besides oxidized silicon, another embodiment is peptide or protein with sulfur residues such as cysteine residues binding directly to gold substrates.

In another embodiment, engineered peptides and proteins can be used that have tethers or small molecules groups attached to them for surface coupling and conformational mobility.

In another embodiment, polymeric (charged or non-ionic) or small molecule additives can be used in the peptide or protein deposition solution. These can, for example, (1) facilitate tip coating, (2) facilitate transport, (3) aid in retention of biological activity of the peptide or protein once it is on the surface.

The nanoscopic tip can be treated with a chemical agent to improve nanolithographic performance in the deposition of peptide and protein patterns. Examples of improved performance include improved reproducibility, improved deposition speed, improved scan speed, improved control over diffusion onto surface, improved resolution, improved durability, improved retention of bioactivity, and inhibition of strong peptide interactions. Multiple embodiments exist, and the treatment with chemical agent can result in different functions. For example, the tip modification can inhibit peptide and protein adsorption to the tip. In addition, the tip modification can reduce the activation energy for peptide and protein transport from the tip to the substrate. Different types of chemical agents can be used depending on the function.

For example, in one embodiment, the nanoscopic tip can be treated with hydrophilic compounds such as, for example, low molecular weight polyalkylene glycol compounds which improves the ability to direct-write peptides and proteins. For example, molecular weight can be about 2,000 or less, or about 1,000 or less. Reference A10a below, for example, describes use of oligo(ethylene glycol) groups in monolayers to control unwanted adsorption. Reference A11 below describes use of poly(ethylene glycol) silanes, having chain lengths of 4-8 PEG units for example. Monolayers of Si-PEG can be, for example, about 10 Å to about 20 Å thick. The tip can be made to be repellant to proteins such as bovine serum albumin (BSA).

Tip modifications are also described in reference A5, which is hereby incorporated by reference.

The following references also pertain to protein resistant binding in the context of tip modification:

(1) Harder et al., *J. Phys. Chem. B.,* 1998, 102, 426-436 (oligo(ethylene glycol)-terminated self-assembled monolayers);
(2) U.S. Pat. No. 6,103,479 (protein adsorptive alkanethiol and polyethylene-terminated alkanethiols which resist protein adsorption);
(3) U.S. Pat. No. 5,858,801 (antibody-resistant materials are bovine serum albumin, gelatin, lysozyme, octoxynol, polyoxyethylenesorbitan monolaurate, polyethylene oxide containing block copolymer surfactant); and
(4) U.S. Pat. No. 5,039,458 (crosslinked polyurethane and polyurea-urethane polymer gels resist nonspecific protein adsorption).

In another embodiment, the chemical agent can be electrostatically charged, including positively or negatively charged. In addition, the chemical agent can be a self-assembled monolayer. For example, the tip can be metal coated and then treated with a chemical agent which forms a self assembled monolayer and provides a negative surface. For example, the tip can be gold coated and treated with alkylsulfur thiol and disulfide compounds to form the self assembled monolayer.

For a selected peptide or protein, the tip treatment can be adjusted to provide the improved peptide or protein deposition.

Applications of particular interest include antibodies arrayed to detect antigens from cell lysates, body fluids, or cell culture supernatants; tissue extracts or purified antigens arrayed to detect serum antibodies or to detect known proteins with detection antibodies; bait proteins immobilized to detect interacting proteins for pathway identification studies; on-chip activity profiling of immobilized enzymes; and large scale proteome arraying of entire expression libraries encoded with fusion proteins as immobilization tags. The nanoarrays are generally produced and used to avoid denaturing the protein. Other particular applications of interest include cytokines, secreted proteins, cell cycle proteins, antibodies, cytochrome P450, proteases, and kinases.

Labels and imaging means used to detect the proteins and reaction products include known methods including, for example, measurement of labels with use of fluorescence, luminescence, and radioactivity, as well as other physical properties methods such as changes in surface plasmons, refractive index or the measurement of mass or thickness. AFM methods can be used.

Background on genomics, gene expressions and biomolecular arrays is provided in reference A2 below, as well as the Madou text noted above.

The invention is further illustrated with use of the following non-limiting working examples. Also, the following references can be used in the practice of the present invention.

WORKING EXAMPLES

Example 1

The approach used herein (FIG. 1) relied on modification of an AFM tip with 2-[methoxypoly(ethyleneoxy)propyl]trimethoxysilane (Si-PEG), which forms a biocompatible and hydrophilic surface layer, which inhibits protein adsorption and, therefore, reduces the activation energy required for protein transport from tip to surface. The molecular weight of Si-PEG is about 460-490 g/mol and the average number of ethylene glycol units is about 6-9 (obtained from HPLC measurements). In the absence of this tip coating, the protein inking solutions (e.g., 500 micrograms/mL in PBS buffer at pH 7.3) may not in some cases wet the untreated silicon nitride cantilevers. Hence, untreated cantilevers can result in some cases in inconsistent, or low-density, protein patterns.

In addition to cantilever modification, two additional strategies have been developed to facilitate ink transport and nanostructure formation (FIG. 1). Both involve silicon oxide surfaces, one having a negatively charged surface through base treatment and the other an aldehyde-modified surface. Besides aldehyde, other organic functional groups can be used which are known to covalently bind to peptide moieties.

The negatively charged silicon wafers were generated by immersing a substrate (Si(100): 4 in. diameter; 3-4.9 ohm/cm resistivity; 500 nm oxide layer, Silicon Quest International Inc., Santa Clara, Calif.) in a solution of $NH_4OH:H_2O_2:H_2O$ (1:1:5) at 65° C. for 1 hour followed by thorough washing with NANOpure water (NANOpure, Barnstead Corp.). Aldehyde modified surfaces were prepared by cleaning oxidized silicon wafers with piranha solution (30% $H_2O_2:H_2SO_4$, 1:4; Caution: Piranha solutions are extremely dangerous and should be used with extreme caution) for one hour, and then treating them with 3-aldehydepropyltrimethoxysilane (0.5% w/v in a 95:5 v/v solution of ethanol and water, adjusted to pH 5 with acetic acid, Bio-Connext™, United Chemical Technologies) for 2 min. The slides were then rinsed with ethanol and cured under flowing nitrogen at 90-100° C. for 15 minutes. With these surfaces, proteins can be successfully deposited on such surfaces by either electrostatic interactions between the positively parts of the protein and oppositely charged substrate surfaces or covalent bonding between amine groups on protein molecule and aldehyde-modified surface. Anti-rabbit IgG (developed in goat, Sigma) was used as a representative example.

Direct-writing nanolithographic patterning imaging experiments were carried out with a ThermoMicroscopes CP atomic force microscope (AFM) and silicon nitride cantilevers (force constant=0.05 N/m). Tapping mode images of sub-100 nm protein nanostructures were taken with a Nanoscope IIIa and MultiMode microscope from Digital Instruments. Fluorescence images were obtained with a Zeiss Axiovert 100 microscope with a Hg lamp excitation source and standard filter. In a typical transport experiment, a Si-PEG modified AFM tip was coated by immersing the tip in a solution containing the desired protein (500 micrograms/mL in PBS buffer at pH 7.3) for 1 min and then blowing the tip dry with nitrogen. The tip was then mounted in the AFM and brought into contact (1.5 nN) with the substrate surface. Patterning of the proteins was performed in an environmentally controlled glove box at relative humidity of about 55% to about 70% at room temperature. For higher molecular weight molecules, a high relative humidity can be an important factor to the transport of molecules from the tip to the surface.

Figure 2:
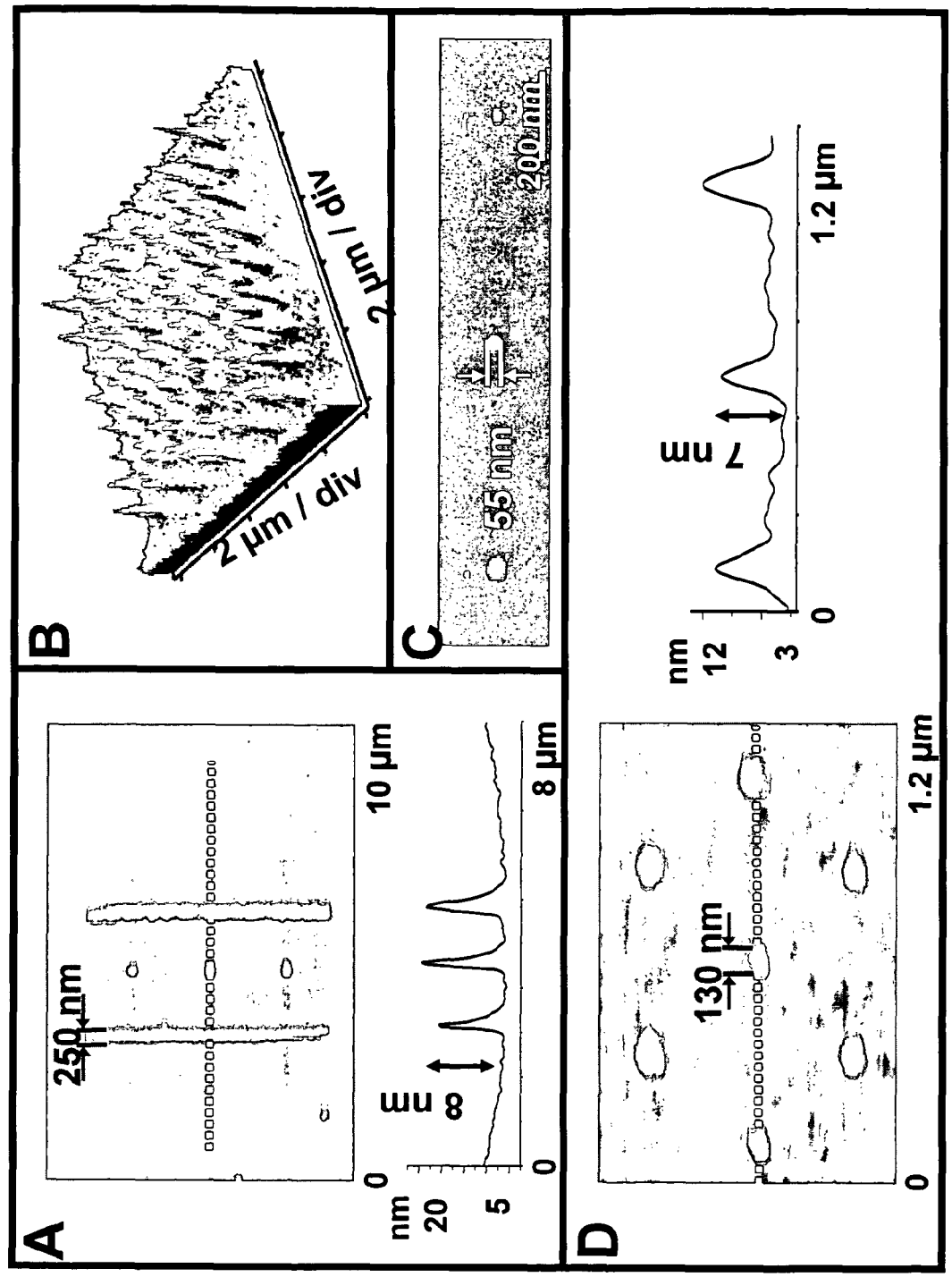
FIG. 2 illustrates AFM topography images of rabbit anti-IgG protein nanostructures. (A) Rabbit anti-IgG protein nanostructures including dots and lines written at 0.08 μm/s, and line profile. (B) 3-D topography image of rabbit anti-IgG protein dot arrays. (C) protein nanofeatures with 55 nm and 200 nm dimensions. (D) protein nanofeatures on aldehyde-modified surfaces.
Figure 3:
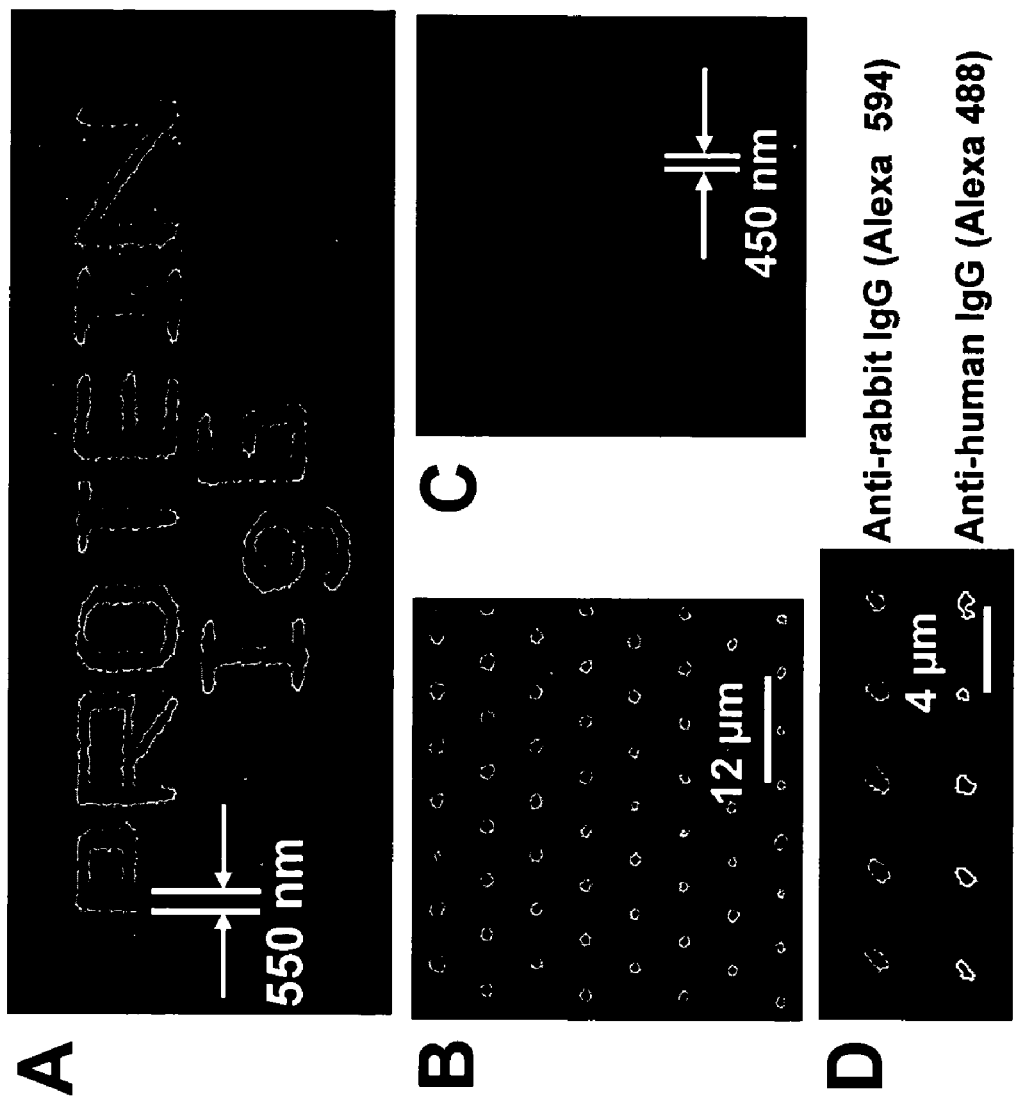
FIG. 3 illustrates fluorescence images of rabbit anti-IgG (labeled with Alexa 594) nanostructures on negatively charged $SiO_2$ substrate. (A) Words (writing speed=0.06 μm/s), (B) dot arrays, (contact time=5 sec) (C) dot arrays (contact time=3 sec). (D) multiple proteins in the same array.

Using these experimental conditions, nanostructures were generated composed of anti-rabbit IgG and rabbit IgG in direct write fashion (see FIGS. 2 and 3). The latter were imaged by fluorescence microscopy, as well as AFM, allowing confirmation of the chemical identity of the transported material. FIGS. 2A-C were generated from base treated substrates, whereas FIG. 2D was generated from an aldehyde treated substrate.

The height profile of an anti-rabbit IgG pattern comprising two parallel lines and three dots generated by direct-write nanolithographic printing shows that each IgG feature is about 8-10 nm high (FIG. 2A), which is consistent with the transfer of a monolayer of the protein to the negatively charged surface. In FIG. 2A, the line width is about 250 nm. Protein nanoarrays can be fabricated by repeating the procedure for forming a single dot feature (FIG. 2B). For example, a nanoarray comprising 85 dots with 450 nm diameter spaced 350 nm apart was fabricated from anti-rabbit IgG. The nanoarray was fabricated in less than 4 minutes using a holding time of about three seconds for each dot.

The protein features studied thus far have been as large as 550 nm and as small as 55 nm (FIG. 2C). Sub-100 nm protein features were successfully patterned using appropriate conditions (contact time=0.5 sec, contact force=0.5 nN). The approach is general, as fluorophore-labeled anti-mouse, goat, and human IgG as well as unlabeled mouse, goat, and human IgG have been patterned with this electrostatic approach.

Proteins can also be patterned on aldehyde derivatized surfaces (FIG. 2D) on a nanoscopic scale. In this approach, a reaction between aldehyde groups on the surface with primary amines (lysines and alpha-amine at their $NH_2$-termini) on the proteins, results in the formation of Schiff bases and the immobilization of the proteins.

Since the anti-rabbit IgG used in these experiments is labeled with a fluorophore, the patterns were visualized by fluorescence microscopy (FIG. 3). Protein nanostructures with 550 nm line-widths (FIG. 3A) and dot nanoarrays (450 nm dots, 6 micron spacing) can be visualized by fluorescence microscopy (FIG. 3B). A fluorescence image of the array corresponding to the 3-D AFM image in FIG. 2B is shown in FIG. 3C. In order to demonstrate multiple protein ink capabilities, two different fluorophore-labeled proteins, anti-rabbit IgG (Alexa Fluor 594) and anti-human IgG (Alexa Fluor 488), were deposited on aldehyde-derivatized surfaces by direct-write nanolithographic printing in a serial fashion (FIG. 3D). Note that the line widths were determined by AFM rather than fluorescence microscopy due to the resolution limitations of the optical technique. Humidity can be an important variable in the deposition. The transport of the protein structures described herein were not, in general, highly humidity dependent over a range of about 55% to about 85% relative humidity at ambient. The most important factors controlling their transport may be set-point (large set-points lead to larger features and contact area). Note that many of the features generated herein do not exhibit the uniform edges associated with the transport of small ink molecules and DNA.

In sum, the studies showed that direct-write nanolithographic printing can be used to direct-write peptides and proteins on multiple, different classes of substrates. When combined with the multiple pen AFM arrays fabricated in these laboratories or others (e.g., Millipede cantilever array technology being developed by IBM), this approach provides rapid generation of nanoarrays and biochips of peptides and proteins with extraordinary complexity, almost at the physical feature size resolution limit (i.e., the size of the individual molecules).

Example 2

An additional tip modification strategy coupled with direct-write nanolithography was provided for depositing proteins and peptide on a surface to form protein and peptide nanostructures. This methodology further offers patterning capabilities on the 45 nm to many micrometer length scale. The bio-recognition properties of nanofeatures composed of immunoglobulin-gamma (IgG) were confirmed by reacting the array with gold nanoparticles coated with anti-IgG. Furthermore, a two component nanoarray was fabricated in direct-write fashion by direct-write printing, and the bio-recognition properties of this structure were invested by atomic force microscopy (AFM) without biodiagnostic labels.

In order to direct-write protein nanoarrays, commercially available AFM tips (ThermoMicroscopes sharpened $Si_3N_4$ Microlever A, force constant=0.05 N/m) were chemically modified. The modification procedure involved immersing the gold-coated cantilever in a 1 mM ethanolic solution of a symmetric 11-mercaptoundecyl-penta (ethylene glycol) disulfide (PEG). This resulted in the formation of a monolayer of PEG that prevents adsorption of protein (see reference A3b and A10) on the reflective Au surface of the cantilever (back side). Tips treated in this manner were rinsed with ethanol, dried, and coated with gold (7 nm, with a 3 nm Ti adhesion layer) on the tip side by thermal evaporation methods. The cantilevers with the gold-coated tips were immersed in 0.1 mM thiotic acid in ethanol for 1 hr, rinsed with ethanol, and then dried with N2 at room temperature. To prepare tips for printing experiments, they were immersed in solutions of the desired protein (500 µg/mL, 10 mM phosphate-buffered saline (PBS), pH 7.1) for 1 h and then used immediately. The hydrophilic tips with the carboxylic acid terminated self assembled monolayers (SAMs) facilitate protein adsorption on the tip surface (see reference A4a and A11). Humidity can be an important variable, as noted above, and optimum patterning results were achieved for these experiments when the experiments were carried out in an environmentally controlled glove box at a relative humidity of about 80% to about 90% at room temperature. In some cases, humidity values below about 70% resulted in inconsistent transport properties. For a particular system, the humidity can be varied to see the effect on consistency. All patterning was done with a ThermoMicroscopes CP AFM interfaced with DPN Write (available from NanoInk, Chicago, Ill.). Tapping mode images were taken with a Nanoscope IIIa and MultiMode microscope from Digital Instruments. Au substrates, prepared via literature methods (see reference A12), were chosen for two reasons. First, the interaction between the cysteine residues of proteins and the Au surface provides a strong driving force for protein adsorption (see reference 6 and 13). Second, they allow use PEG as a passivating layer in the areas not occupied by the proteins to resist non-specific adsorption of proteins from solution.

As proof-of-concept experiments, lysozyme (Lyz) and rabbit immunoglobulin-gamma (IgG) nanodot arrays were constructed in direct-write fashion, FIGS. 5A and B. Feature size could be controlled over the 45 nm to many micrometer range by controlling the tip substrate contact time. In general, longer contact times led to larger features, but the rate of transport is generally dependent, at times highly dependent, upon protein composition. For a given size and charge of protein, the contact time for producing a specific feature size, for a particular tip and substrate, can be measured and predicted (see, for example, McKendry et al., *NanoLetters*, 2002, 2, 713-716. The protein diffuses slowly having a large molecular weight. The areas surrounding the patterns were then passivated with PEG by adding a droplet of 1 mM PEG in Nanopure $H_2O$ (18.1 M ohm) directly on the patterned area for 45 min in a sealed vessel followed by copious rinsing with Nanopure $H_2O$. Nanopure $H_2O$ was used as a solvent for the PEG in order to minimize denaturation of protein structures in the patterned area. Organic solvents such as ethanol, which are used often with PEG, generally can have the potential to denature the protein structures and subsequently cause them to lose their bio-recognition properties. In the case of IgG, to test the bio-recognition properties of the nanoarray, it was incubated in a solution of gold nanoparticles (10 nm, diluted 1/10 in 10 mM PBS, obtained from Ted Pella) coated with ant-rabbit IgG for 3 h. A comparison of the AFM height profiles of the array before and after treatment with this solution shows a height increase of 9.6±0.9 nm (n=10) in the active area of the array with little nonspecific binding to the passivated, inactive areas, FIGS. 5C and D.

Figure 4:
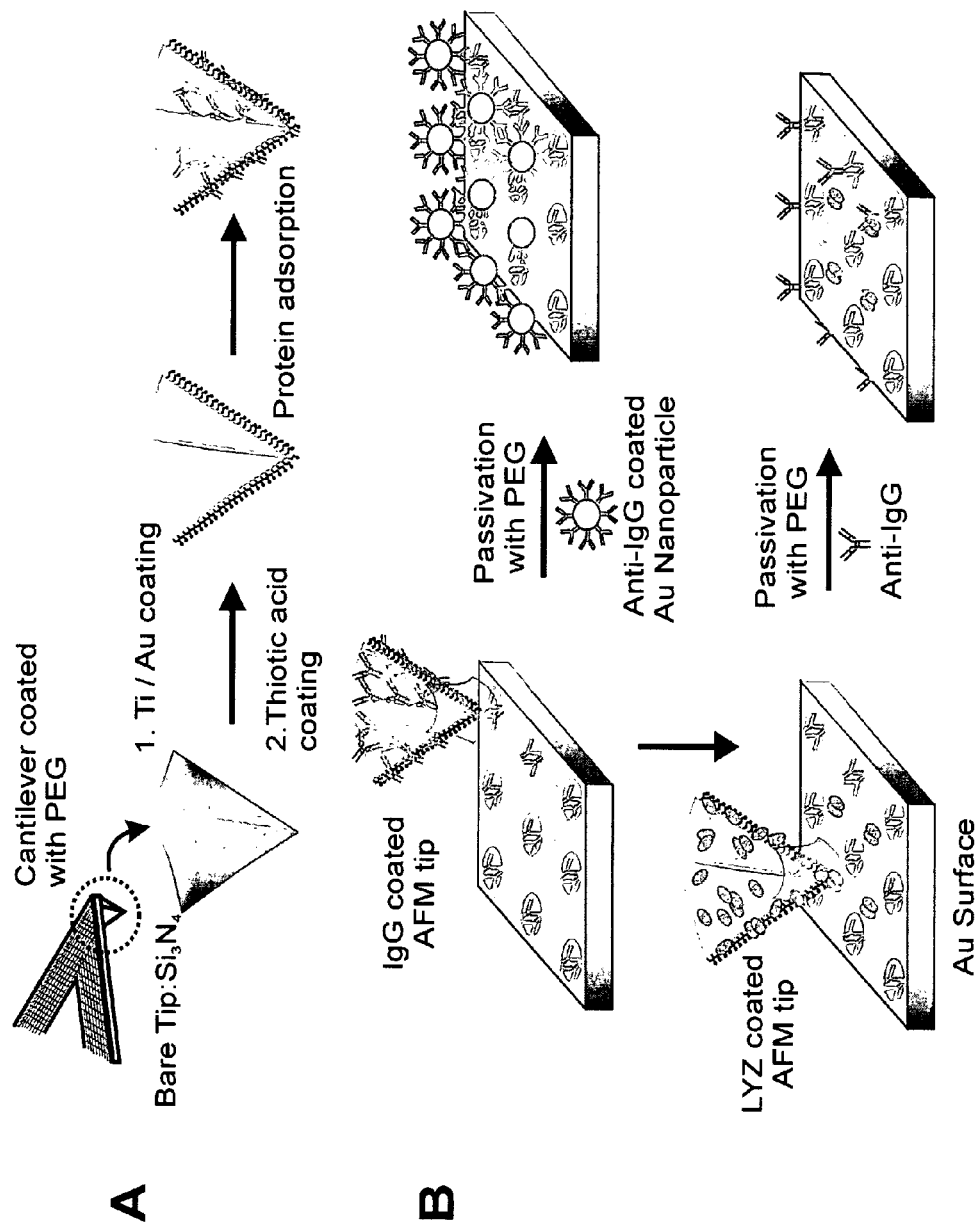
FIG. 4 illustrates (A) coating a cantilever followed by protein adsorption, and (B) preparing protein nanoarrays.
Figure 5:
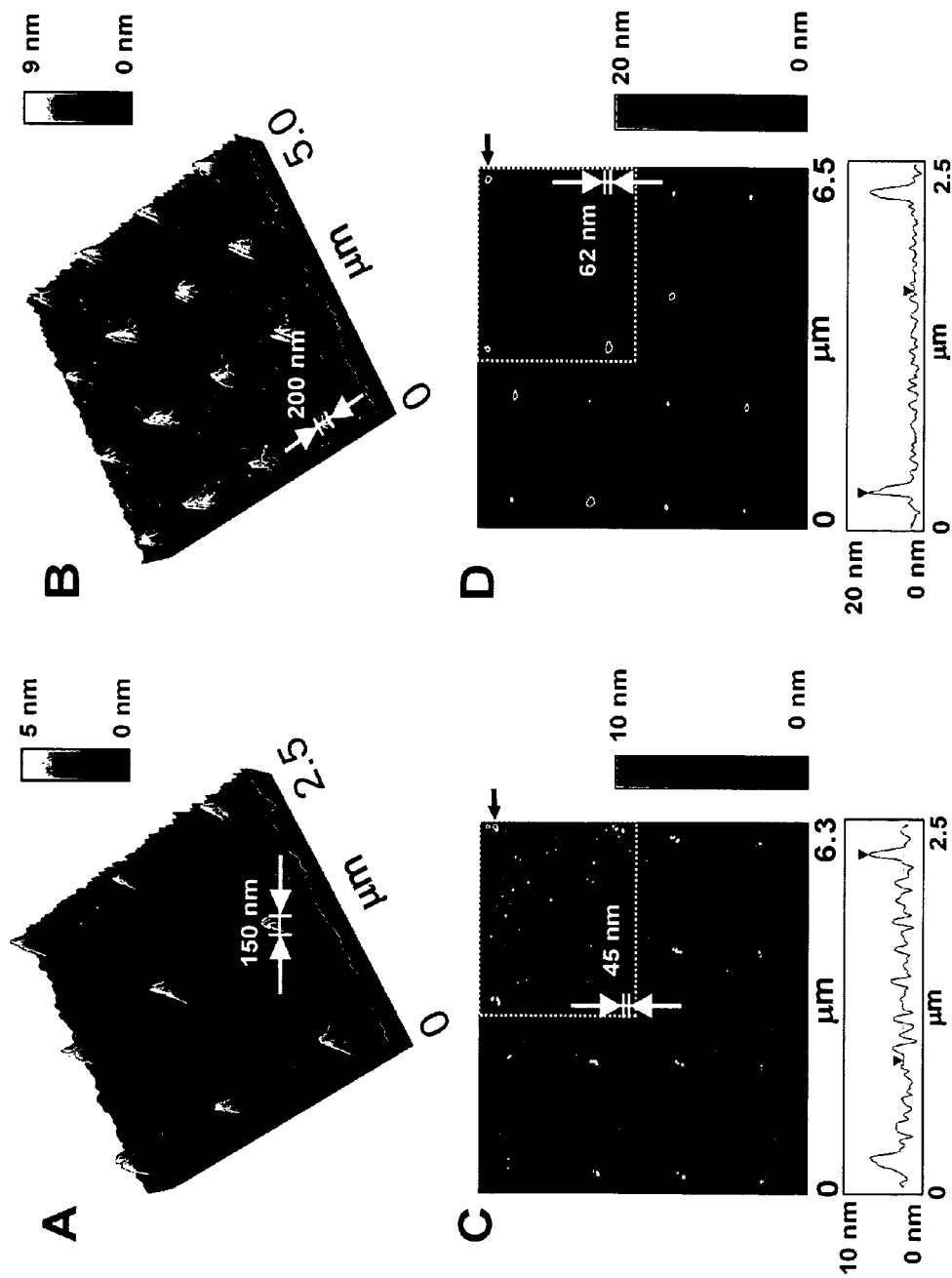
FIG. 5 illustrates protein nanoarrays prepared via direct-write nanolithography. (A): Contact mode image (contact force 0.1 nN) of Lysozyme nanodot arrays. Each dot took 20 s to form. (B): Contact mode image (contact force 0.1 nN) of IgG nanodot arrays. Each dot took 30 s to form. An IgG nanodot array before (C) and after (D) treatment with PEG and a solution anti-IgG coated Au nanoparticles: Images were taken at 0.5-Hz scan rate in tapping mode. Each dot took 5 s to form.
Figure 6:
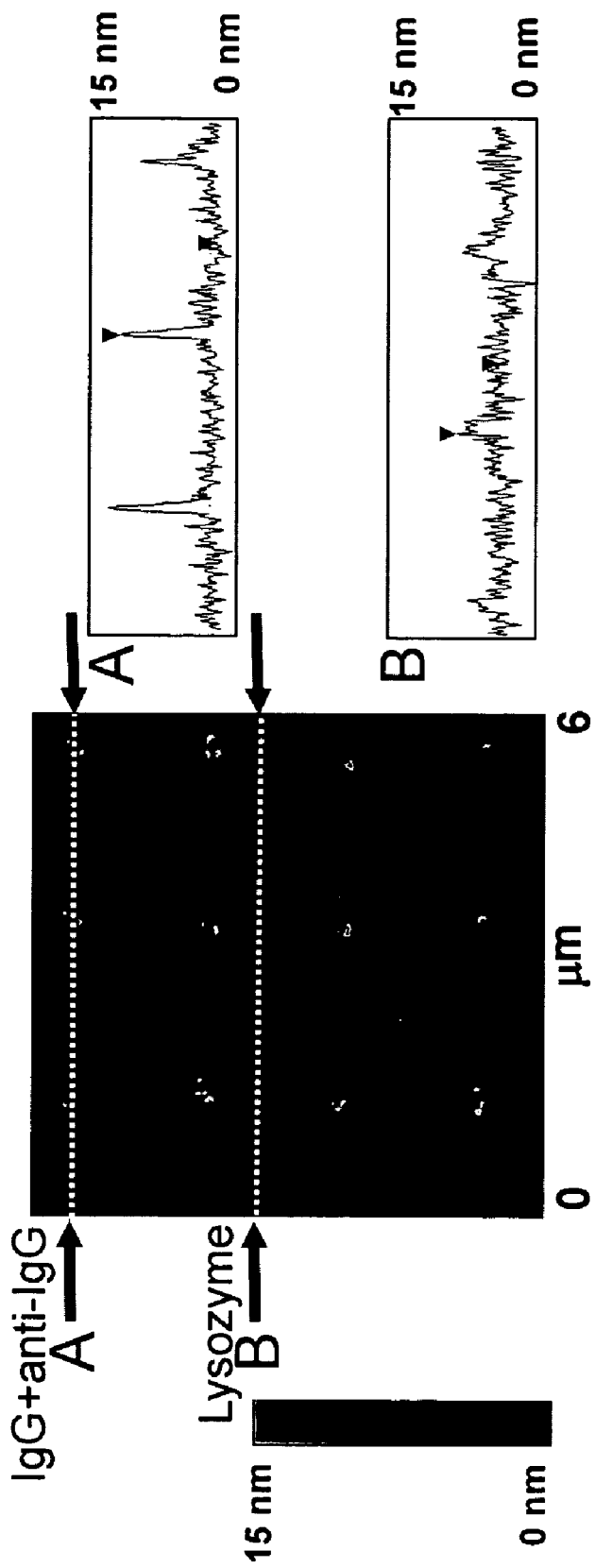
FIG. 6 illustrates two component protein pattern after reaction with anti-IgG. (A): A height increase of 5.5±0.9 nm (n=10) in the IgG features is observed by AFM. (B): No height increase is observed. The image was taken under the same conditions in FIG. 1 (C) and (D).

One of the advantages of direct-write patterning over indirect methods is that one can fabricate complex multicomponent nanostructure assemblies with no cross-contamination. To demonstrate this concept, rabbit IgG nanoarrays were generated as described above, and then lysozyme features were patterned in-between the IgG features. FIG. 4 and FIG. 6. To confirm the bio-recognition properties of the IgG in the two component array, the array was incubated in a solution containing anti-rabbit IgG (10 μg/mL, 10 mM PBS, pH 7.1) for 1 h. Significantly, a height increase (5.5±0.9 nm (n=10)) due to anti-rabbit IgG binding can be observed only on the rabbit IgG features and not the area patterned with lysozyme, FIG. 6. This near doubling of feature height is attributed to a 1:1 reaction between the two protein structures (see references A3b and A7), and further demonstrates how probeless detection is possible with these nanoscale systems. Note that the density of the anti-IgG bound to the IgG features is non uniform; this has been attributed in other studies to the random orientation of the IgG epitopes and their partial denaturation after adsorption on the Au surface (see reference A13).

This work is important for many reasons. For example, this is a convenient method, amendable to massive parallelization (see reference A14) for generating protein and peptide nano structures on a surface in direct-write fashion. These are some of the smallest protein structures generated by any lithographic technique. Second, the direct-write nature of the printing allows one to make and align multiple nanostructures made of different proteins and peptides on one surface, a prerequisite for generating functional multicomponent proteomic arrays for use in biochemical and molecular biology research, Third, these proteins and peptides are some of the largest structures ever transported by direct-write nanolithographic printing with nanoscopic tips demonstrating the versatility of the approach. The generally and relatively slow diffusion rates of these large structures (seconds to minutes per feature, FIG. 5) and the need for chemically modified tips underscore the importance of developing chemistry and physical processes that facilitate macromolecule transport in a direct-write printing experiment. Another point is the usefulness of passivating the back of the cantilever against protein or peptide adhesion so the laser signal would not be diminished.

Figure 7:
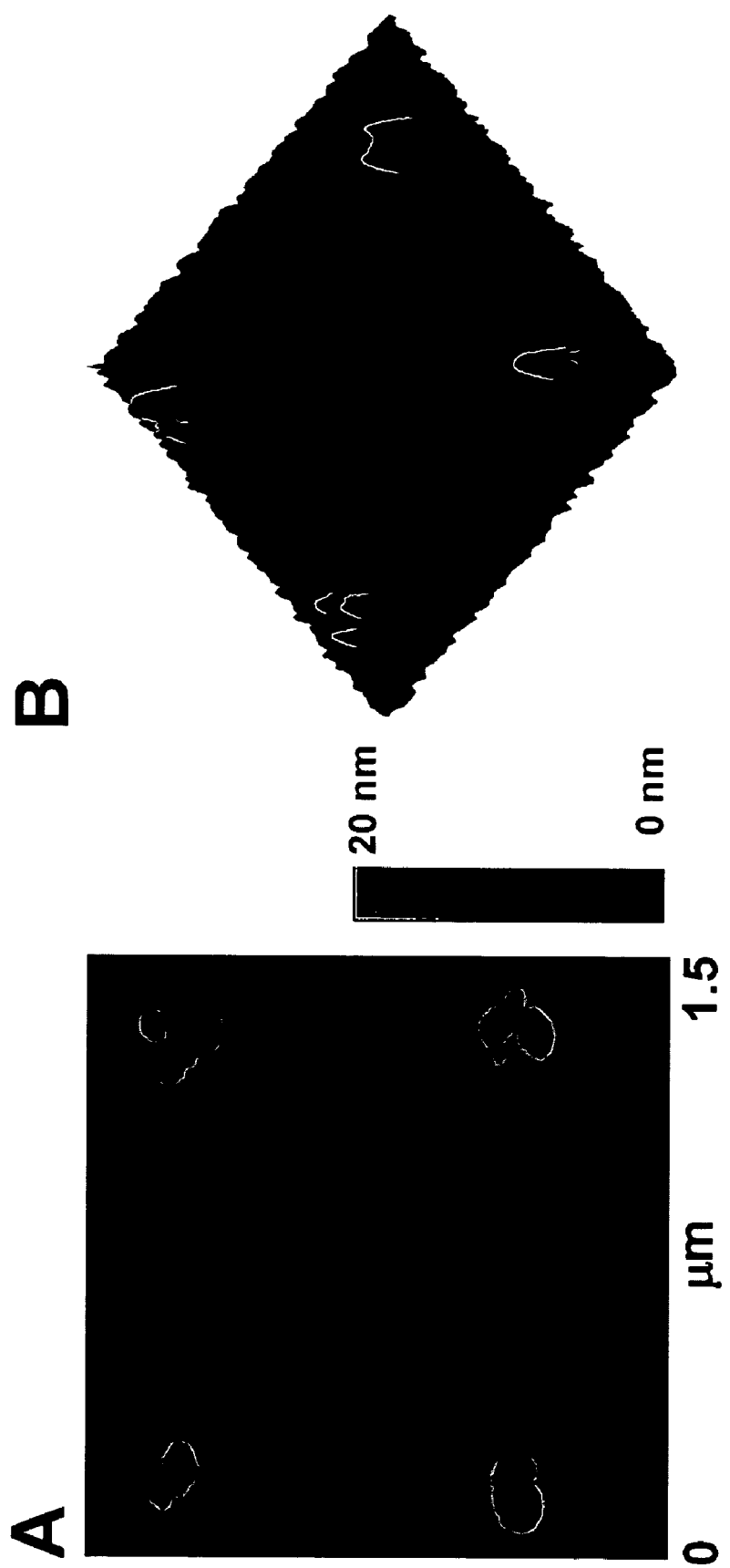
FIG. 7 illustrates (A) zoom-in image of an IgG nanodot array after treatment with an aqueous solution of anti-IgG coated Au nanoparticles. (B) Three dimensional image of (A).
Figure 8:
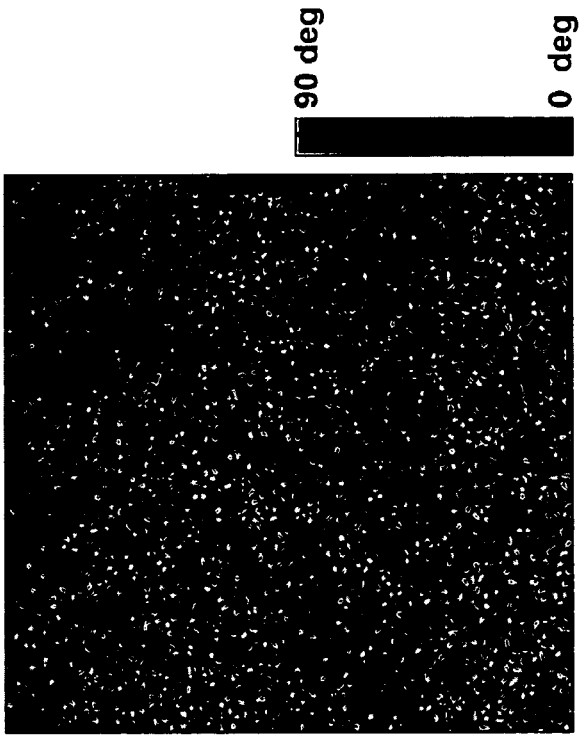
FIG. 8 illustrates zoom-in image of two component protein pattern after reaction with anti-IgG. (A) Topography image and (B) phase image.
Figure 8:
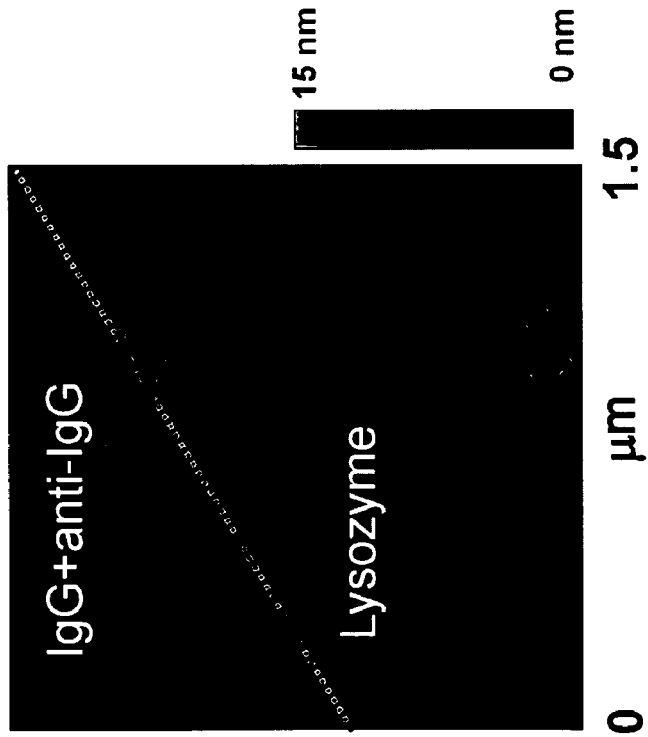

FIGS. 7 and 8 provide further high resolution images of single and multiple protein nanodot arrays prepared by the methods described in Example 2.

REFERENCES

I. Patent Documents:
  1. U.S. Provisional application 60/115,133 filed Jan. 7, 1999 ("Dip Pen Nanolithography") to Mirkin et al.
  2. U.S. Provisional application 60/157,633 filed Oct. 4, 1999("Methods Utilizing Scanning Probe Microscope Tips and Products Therefor or Produced Thereby") to Mirkin et al.
  3. U.S. Regular patent application Ser. No. 09/477,997 filed Jan. 5, 2000 ("Methods Utilizing Scanning Probe Microscope Tips and Products Therefor or Produced Thereby") to Mirkin et al.
  4. U.S. Provisional application 60/207,713 filed May 26, 2000 ("Methods Utilizing Scanning Probe Microscope Tips and Products Therefor or Produced Thereby") to Mirkin et al.
  5. U.S. Provisional application 60/207,711 filed May 26, 2000 ("Methods Utilizing Scanning Probe Microscope Tips and Products Therefor or Produced Thereby") to Mirkin et al.
  6. U.S. Regular application Ser. No. 09/866,533 filed May 24, 2001 ("Methods Utilizing Scanning Probe Microscope Tips and Products Therefor or Produced Thereby") to Mirkin et al.
  7. U.S. patent publication number 2002/0063212 A1 published May 30, 2002 ("Methods Utilizing Scanning Probe Microscope Tips and Products Therefor or Produced Thereby") to Mirkin et al.
  8. U.S. patent publication number 2002/0122873 A1 published Sep. 5, 2002 ("Nanolithography Methods and Products Produced Therefor and Produced Thereby").
  9. PCT publication number WO 00/41213 A1 published Jul. 13, 2000 based on PCT application no. PCT/US00/00319 filed Jan. 7, 2000 ("Methods Utilizing Scanning Probe Microscope Tips and Products Therefor or Produced Thereby").
  10. PCT publication number WO 01/91855 A1 published Dec. 6, 2001 based on PCT application no. PCT/US01/17067 filed May 25, 2001 ("Methods Utilizing Scanning Probe Microscope Tips and Products Therefor or Produced Thereby").
  11. U.S. regular patent application, Ser. No. 10/366,717 to Eby et al., filed Feb. 14, 2003 ("Methods and Apparatus for Aligning Patterns on a Substrate").
  12. U.S. regular patent application, Ser. No. 10/375,060 to Dupeyrat et al., filed Feb. 28, 2003 ("Nanolithographic Calibration Methods").
  13. U.S. Patent Publication 2003/0068446, published Apr. 10, 2003 to Mirkin et al. ("Protein and Peptide Nanoarrays")
  14. U.S. Regular patent application, Ser. No. 10/307,515 filed Dec. 2, 2002 to Mirkin et al. ("Direct-Write Nanolithographic Deposition of Nucleic Acids from Nanoscopic Tips").
  15. U.S. Regular patent application, Ser. No. 10/320,721 filed Dec. 17, 2002 to Mirkin. et al. ("Patterning of Solid State Features by Direct-Write Nanolithographic Printing").
  16. U.S. Patent Publication 2003/0022470, published Jan. 30, 2003, Liu et al. ("Parallel, Individually Addressable Probes for Nanolithography").
  17. U.S. Patent Publication 2003/0007242, published Jan. 9, 2003 to Schwartz ("Enhanced Scanning Probe Microscope and Nanolithographic Methods Using Same").
  18. U.S. Patent Publication 2003/0005755, published Jan. 9, 2003 to Schwartz ("Enhanced Scanning Probe Microscope").

II. Publications
  (A1) MacBeath, G., Schreiber, S. L. *Science* 2000, 289, 1760-1763.
  (A2) Lockhart, D. J., Winzeler, E. A. *Nature* 2000, 405, 827-836.
  (A3) (a) Chen, C. S. Mrksich, M., Huang, S., Whitesides, G. M., Ingber, D. E. *Science* 1997, 276,1425-1428.
  (b) Lee, K.-B., Park, S.-J., Mirkin, C. A., Smith, J. C., Mrksich, M. *Science* 2002, 295, 1702-1705.
  (A4) (a) Wadu-Mesthrige, K., Amro, N. A., Garno, J. C. Xu, S., Liu, G. *Biophys. J.* 2001, 80, 1891-1 899. (b) Wadu-Mesthrige, K., Amro, N. A, Liu, G. *Scanning* 2000, 22,380-388.
  (A5) Demers, L. M., Ginger, D. S., Park, S.-J., Li, Z., Chung, S.-W., Mirkin, C. A. *Science* 2002, 296, 1836-1838.
  (A6) Wilson, D. L., Martin, R., Hong, S., Cronin-Gofomb, M., Mirkin, C. A., Kaplan, B. L. *Proc. Natl., Acad. Sci. U.S.A.* 2001, 98, 13660-13664.
  (A7) Agarwal, G., Sowards, L. A., Naik, R. R., Stone, M. O., *J. Am. Chem. Soc.* 2003, 125, 580-583.
  (A8) Kenseth, J. R., Harnisch, J. A., Jones, V. W., Porter, M. D. *Langmuir* 2002, 17, 4105-4112.

(A9) Noy, A., Miller, A. E., Klare, J. E., Weeks, B. L., Woods. B. W., DeYoreo, J. J. *Nano Lett.* 2002, 2, 109-112.

(A10) (a) Houseman, B. T., Gawalt, E. G., Mrksich, M. *Langmuir* ASAP Article (b) Smith J. C., Lee, K.-B., Wang, Q., Finn, M. G., Johnson, J. E., Mrksich, M., Mirkin, CA. *Nano Lett.*, 2003 (in press).

(A11) Papra, A., Gadegaard, N., Larsen, N. B. *Langmuir* 2001, 17, 1457-1460.

(A12) Weinberger D. A., Hong S., Mirkin. C. A., Wessels, B. W., Higgins, T. B., *Adv. Mater.* 2000, 12, 1600-1603.

(A13) (a) O'Brien, J. C., Jones, V. W., Porter, M. D. Anal. Chem. 2000, 72, 703-7 10.

(b) Jones, V. W., Kenseth, J. R., Porter, M. D. Anal. Chem. 1998, 70, 1222-1241.

(c) Hermnanson, G. T. *Bioconjugate Techniques*. Academic Press Inc: San Diego, 1996.

(A14) (a) Zhang. M.; Bullen, D.; Chung, S. -W.; Hong, S.; Kee, R. S.; Fan, Z.; Mirkin, C. A.; Liu, C. *Nanotechnology*, 2002, 13, 212-2 17.

(b) Service, R. F. *Science* 2002, 298, 2322-2323.

(A15) (a) Blawas, A. S. et al. *Biomaterials* 1998, 19, 595-609.

(b) Schena, M. et al. *Science* 1995, 270, 467-470.

(A16) (a) Piner et al. *Science,* 1999, 283, 661-663.

(b) Hong. S. et al. *Science* 1999, 286, 523-525.

What is claimed is:

1. A method of direct-write lithography for improving the deposition of selected protein patterning compounds comprising:
   providing a substrate surface;
   providing a tip with a selected protein patterning compound thereon;
   depositing the selected protein patterning compound from the tip to the substrate surface to produce a pattern,
   wherein the tip is modified by a layer comprising one or more selected hydrophilic polyalkylene glycol compounds to inhibit protein adsorption and to improve deposition of the selected protein patterning compound to the substrate surface;
   wherein the depositing step is carried out at a rate of at least about 85 dots per four minutes per tip.

2. A method according to claim 1, wherein the selected hydrophilic polyalkylene glycol compounds improves scan speed.

3. A method according to claim 1, wherein the selected hydrophilic polyalkylene glycol compounds improves resolution.

4. A method according to claim 1, wherein the tip is modified to reduce the activation energy for protein transport from tip to surface.

5. A method according to claim 1, wherein the hydrophilic compound is one or more polyalkylene glycol compounds having a molecular weight of about 2,000 or less.

6. A method according to claim 1, wherein the selected hydrophilic polyalkylene glycol compounds is one or more silane compounds.

7. A method according to claim 1, wherein the selected hydrophilic polyalkylene glycol compounds is electrostatically charged.

8. A method according to claim 1, wherein the selected hydrophilic polyalkylene glycol compounds is negatively charged.

9. A method according to claim 1, wherein the selected hydrophilic polyalkylene glycol compounds forms a self-assembled monolayer on the tip.

10. A method according to claim 1, wherein the selected hydrophilic polyalkylene glycol compounds forms a self-assembled monolayer on the tip and is negatively charged.

11. A method according to claim 1, wherein the tip is coated with metal and the selected hydrophilic polyalkylene glycol compounds forms a self-assembled monolayer on the metal-coated tip and is negatively charged.

12. A method according to claim 1, wherein the tip is a scanning probe nanoscopic tip.

13. A method according to claim 1, wherein the tip is an AFM tip.

14. A method according to claim 1, wherein the tip is a hollow tip.

15. A method according to claim 1, wherein the substrate surface is adapted before deposition to provide a stable protein pattern.

16. The method according to claim 1, wherein the substrate surface is adapted before deposition to covalently bond to the protein patterning compound.

17. The method according to claim 1, wherein the substrate surface is adapted to chemisorb to the protein patterning compound.

18. The method according to claim 1, wherein the substrate surface is adapted to electrostatically bond to the protein patterning compound.

19. A method according to claim 1, wherein the pattern includes a dot.

20. A method according to claim 1, wherein the pattern includes a line.

21. The method according to claim 1, wherein the pattern includes dot diameter or line width of 1,000 nm or less.

22. The method according to claim 1, wherein the pattern includes dot diameter or line width of 500 nm or less.

23. The method according to claim 1, wherein the pattern includes dot diameter or line width of about 50 nm to about 550 nm.

24. The method according to claim 1, wherein the pattern is a dot or line one protein molecule wide and high.

25. The method according to claim 1, wherein the pattern has a height of about 8 nm to about 10 nm.

26. The method according to claim 1, wherein the protein patterning compound is a simple protein.

27. The method according to claim 1, wherein the protein patterning compound is a conjugated protein.

28. The method according to claim 1, wherein the protein patterning compound is a globularprotein.

29. The method according to claim 1, wherein the protein patterning compound is a fibrous protein.

30. The method according to claim 1, wherein the protein patterning compound is an enzyme.

31. The method according to claim 1, wherein the protein patterning compound is a viral protein.

32. The method according to claim 1, wherein the protein patterning compound is complexed with other protein, polypeptide, peptide, or nucleic acid.

33. The method according to claim 1, wherein the protein patterning compound is applied to the tip using a solution of protein comprising an additive, wherein the additive improves application to the tip, improves protein deposition, or improvise retention of protein biological activity upon application to the surface.

34. The method according to claim 1, wherein the relative humidity during deposition at room temperature is about 55% to about 70%.

35. The method according to claim 1, wherein the lithography is nanolithography, the tip is an atomic force microscopic tip and is modified to inhibit protein adsorption, and the selected hydrophilic polyalkylene glycol compounds are electrostatically charged.

36. The method according to claim 35, wherein the pattern includes dot diameter or line width of 1,000 nm or less.

37. The method according to claim 36, wherein the relative humidity during deposition at room temperature is about 55% to about 70%.

38. A method of direct-write nanolithography for improving the deposition of selected peptide patterning compounds comprising:
providing a substrate surface;
providing a nanoscopic tip with a selected peptide patterning compound thereon;
depositing the selected peptide patterning compound from the tip to the substrate surface to produce a pattern,
wherein the tip is modified by a layer comprising one or more selected hydrophilic polyalkylene glycol compounds to improve deposition of the selected peptide patterning compound to the substrate surface;
wherein the depositing step is carried out at a rate of at least about 85 dots per four minutes per tip.

39. A method according to claim 38, wherein the selected hydrophilic polyalkylene glycol compounds improves scan speed.

40. A method according to claim 38, wherein the selected hydrophilic polyalkylene glycol compounds improves resolution.

41. A method according to claim 38, wherein the tip is modified to inhibit peptide adsorption.

42. A method according to claim 38, wherein the tip is modified to reduce the activation energy for peptide transport from tip to surface.

43. A method according to claim 38, wherein the hydrophilic compound is one or more polyalkylene glycol compounds having a molecular weight of about 2,000 or less.

44. A method according to claim 38, wherein the selected hydrophilic polyalkylene glycol compounds is one or more silane compounds.

45. A method according to claim 38, wherein the chemical agent is negatively charged.

46. A method according to claim 38, wherein the selected hydrophilic polyalkylene glycol compounds forms a self-assembled monolayer on the tip.

47. A method according to claim 38, wherein the selected hydrophilic polyalkylene glycol compounds forms a self-assembled monolayer on the tip and is negatively charged.

48. A method according to claim 38, wherein the tip is coated with metal and the selected hydrophilic polyalkylene glycol compounds forms a self-assembled monolayer on the metal-coated tip and is negatively charged.

49. A method according to claim 38, wherein the nanoscopic tip is a scanning probe microscope nanoscopic tip.

50. A method according to claim 38, wherein the nanoscopic tip is an AFM tip.

51. A method according to claim 38, wherein the nanoscopic tip is a hollow tip.

52. A method according to claim 38, wherein the substrate surface is adapted to provide a stable peptide pattern.

53. The method according to claim 38, wherein the substrate surface is adapted to covalently bond to the peptide.

54. The method according to claim 38, wherein the substrate surface is adapted to chemisorb to the peptide.

55. The method according to claim 38, wherein the substrate surface is adapted to electrostatically bond to the peptide.

56. A method according to claim 38, wherein the pattern includes a dot.

57. A method according to claim 38, wherein the pattern includes a line.

58. The method according to claim 38, wherein the pattern includes dot diameter or line width of 1,000 nm or less.

59. The method according to claim 38, wherein the pattern includes dot diameter or line width of 500 nm or less.

60. The method according to claim 38, wherein the pattern includes dot diameter or line width of about 50 nm to about 550 nm.

61. The method according to claim 38, wherein the pattern is a dot or line one peptide molecule wide and high.

62. The method according to claim 38, wherein the pattern has a height of about 8 nm to about 10 nm.

63. The method according to claim 38, wherein the peptide patterning compound is a simple peptide.

64. The method according to claim 38, wherein the peptide patterning compound is a complex peptide.

65. The method according to claim 38, wherein the peptide patterning compound comprises a protein.

66. The method according to claim 38, wherein the peptide patterning compound comprises an oligopeptide.

67. The method according to claim 38, wherein the peptide patterning compound comprises a polypeptide.

68. The method according to claim 38, wherein the peptide patterning compound is in combination with non-peptide units.

69. The method according to claim 38, wherein the peptide patterning compound comprises a single polypeptide chain.

70. The method according to claim 38, wherein the peptide patterning compound comprises multiple polypeptide chains.

71. The method according to claim 38, wherein the peptide patterning compound includes ten or less peptide bonds.

72. The method according to claim 38, wherein the peptide patterning compound comprises at least 100 peptide.

73. The method according to claim 38, wherein the peptide patterning compound comprises a globular protein.

74. The method according to claim 38, wherein the peptide patterning compound comprises a fibrous protein.

75. The method according to claim 38, wherein the peptide patterning compound comprises an enzyme.

76. The method according to claim 38, wherein the peptide patterning compound comprises an virus.

77. The method according to claim 38, wherein the peptide patterning compound comprises a antibody.

78. The method according to claim 38, wherein the peptide patterning compound is applied to the tip using a solution of protein comprising an additive, wherein the additive improves application to the tip, improves protein deposition, or improvise retention of protein biological activity upon application to the surface.

79. The method according to claim 38, wherein the relative humidity during deposition is at least 50%.

80. The method according to claim 38, wherein the relative humidity during deposition is about 55% to about 70%.

81. The method according to claim 38, wherein the tip is modified to inhibit peptide adsorption, the selected hydrophilic polyalkylene glycol compounds are electrostatically charged, and the nanoscopic tip is a scanning probe microscope tip.

82. The method according to claim 81, wherein the relative humidity during deposition is about 55% to about 70%.

83. The method according to claim 82, wherein the peptide patterning compound comprises an oligopeptide.

84. The method according to claim 38, wherein the tip is modified to inhibit peptide adsorption, the chemical agent is electrostatically charged, and the nanoscopic tip is an atomic force microscope tip.

85. The method according to claim 84, wherein the relative humidity during deposition is at least about 70%.

86. The method according to claim 84, wherein the relative humidity during deposition is about 55% to about 70%.

87. A method of direct-write nanolithography comprising:
providing an atomic force microscopic tip modified with one or more polyalkylene glycol compounds to resist protein adsorption and which is coated with protein,
providing a substrate comprising an electrostatically charged surface, and
depositing the protein on the surface to form a protein pattern
wherein the depositing step is carried out at a rate of at least about 85 dots per four minutes per tip.

88. The method according to claim 87, wherein the pattern includes a dot.

89. The method according to claim 87, wherein the pattern includes a line.

90. The method according to claim 87, wherein the pattern is an array of dots or lines.

91. The method according to claim 87, wherein the protein pattern is a monolayer of protein.

92. The method according to claim 87, wherein the protein pattern has protein features about 100 nm to about 550 nm.

93. The method according to claim 87, wherein the protein is labeled with a fluorophore.

94. The method according to claim 87, wherein the tip is modified by a hydrophilic, biocompatible compound to resist protein adsorption, and the protein pattern has protein features about 100 nm to about 550 nm.

95. The method according to claim 94, wherein the pattern is an array of dots or lines.

96. A method of direct-write nanolithography for improving the deposition of selected protein patterning compounds consisting essentially of:
providing a substrate surface;
providing a nanoscopic tip with a selected natural protein patterning compound thereon;
depositing the selected protein patterning compound from the tip to the substrate surface to produce a pattern,
wherein the tip is modified by a hydrophilic compound to improve deposition of the selected protein patterning compound to the substrate surface, wherein the hydrophilic compound is one or more polyalkylene glycol silane compounds having a molecular weight of about 2,000 or less and, wherein the depositing step is carried out at a rate of at least about 85 dots per four minutes per tip.

97. A method for improving the deposition of selected peptide patterning compounds consisting essentially of:
providing a substrate surface;
providing a nanoscopic tip with a selected natural peptide patterning compound thereon;
depositing the selected peptide patterning compound from the tip to the substrate surface to produce a pattern by direct-write nanolithography,
wherein the tip is modified by a hydrophilic compound to improve deposition of the selected peptide patterning compound to the substrate surface, wherein the depositing step is carried out at a rate of at least about 85 dots per four minutes per tip, and wherein the hydrophilic compound is one or more polyalkylene glycol silane compounds having a molecular weight of about 2,000 or less.

98. A method for high resolution direct-write nanolithography of peptide and protein arrays, comprising:
direct-write nanolithographic printing of the peptide or protein onto a substrate from a nanoscopic tip to provide a protein or peptide patterned array on the substrate, wherein the nanoscopic tip has been adapted for peptide or protein deposition and the array is characterized by a pattern separation distance of less than about 1,000 nm, wherein the printing step is carried out at a rate of at least about 85 dots per four minutes per tip; and wherein the tip is modified by one or more polyalkylene glycol silane compounds having a molecular weight of about 2,000 or less.

99. The method according to claim 98, wherein the pattern separation distance is less than about 500 nm.

100. The method according to claim 98, wherein the pattern separation distance is less than about 350 nm.

101. The method according to claim 98, wherein the array is an array of dots.

102. The method according to claim 98, wherein the array is an array of lines.

103. The method according to claim 98, wherein the nanoscopic tip is an atomic force microscope nanoscopic tip.

104. The method according to claim 98, wherein the pattern comprises dots having dot diameter of about 100 nm to about 550 nm.

105. The method according to claim 98, wherein the pattern comprises dots having a height of about 8 nm to about 10 nm.

106. A method of depositing a plurality of different protein nanoscopic deposits, comprising direct write nanolithographic writing of the protein with nanoscopic tips treated with one or more hydrophilic compounds that inhibit protein adsorption, wherein the average distance between the nanoscopic deposits is about 500 nm or less, wherein the writing step is carried out at a rate of at least about 85 dots per four minutes per tip.

107. A method according to claim 106, wherein the average distance between the nanoscopic deposits is about 350 nm or less.

108. A method according to claim 106, wherein the average distance between the nanoscopic deposits is about 100 nm or less.

109. A method for generating protein arrays comprising depositing from a nanoscopic tip dots of proteins onto a substrate at a rate of at least about 85 dots per four minutes per tip; wherein the tip is modified by one or more hydrophilic compounds that inhibit protein adsorption to improve deposition of the selected peptide patterning compound to the substrate surface.

110. The method according to claim 1, wherein the dots have dot diameters of about 550 nm or less.

111. The method according to claim 1, wherein the dots are separated by a separation distance of about 1,000 nm or less.

112. The method according to claim 1, wherein the dots are separated by a separation distance of about 500 nm or less.

113. The method according to claim 1, wherein the dots are separated by a separation distance of about 350 nm or less.

114. The method according to claim 1, wherein the dots comprise at least two different types of proteins.

115. The method according to claim 1, wherein the dots are about 10 nm high or less.

* * * * *